INVENTORS
Harold V. Trask
Kenneth M. Haley

Oct. 13, 1953 H. V. TRASK ET AL 2,655,365
APPARATUS FOR DISCHARGING SOLID MATERIAL
Filed Dec. 19, 1951 3 Sheets-Sheet 2

INVENTORS
Harold V. Trask
Kenneth M. Haley
BY
Attorneys

INVENTORS
Harold V. Trask
BY Kenneth M. Haley

Patented Oct. 13, 1953

2,655,365

UNITED STATES PATENT OFFICE 2,655,365

APPARATUS FOR DISCHARGING SOLID MATERIAL

Harold V. Trask and Kenneth M. Haley, Ashland, Ky., assignors to Oglebay, Norton and Company, Cleveland, Ohio, a corporation of Delaware Application December 19, 1951, Serial No. 262,456

27 Claims. (Cl. 263—29)

This invention relates to an apparatus for effecting discharge of solid material from the bottoms of containers therefor and, more particularly, to an improved means for controlling the discharge of material from shaft furnaces.

An object of the invention is to provide an improved apparatus for effecting periodic discharge of solid material from the bottom of a shaft furnace, bin or other container for the material, the said apparatus having no moving parts contacting the material so that wear and maintenance are reduced to a minimum.

Another object of the invention is to provide an improved apparatus for effecting periodic discharge of solid material from the bottom of a shaft furnace, bin or other container therefor wherein the discharging action is effected by periodic pulses of fluid pressure with the periodicity of the pulses being automatically controlled by the height of the material in the container.

A further object of the invention is to provide an improved apparatus for effecting discharge of solid material from a structure in which the material gravitates into a liquid seal at the bottom thereof and from which the material is periodically discharged by cyclic pulses of pressure applied to the seal.

An additional object of the invention is to provide a shaft furnace for heating and/or indurating discrete bodies of mineral solids, for example, pellets of iron ore concentrates, with an improved discharge means for the bodies, which means is so constructed and arranged that it eliminates dust and gas losses from the bottom of the furnace, cools the bodies and removes fines therefrom, is not damaged or stopped by clinkers or other large objects, has no moving mechanical parts contacting the bodies, and is easily controlled to provide a wide range of discharge rates.

A more specific object of the invention is to provide an improved material discharging means for a shaft furnace in the form of a liquid seal for the bottom of the furnace to which pulses of fluid pressure are periodically applied for causing displacement of a portion of the liquid and of the material from the furnace, the construction being such that only a small amount of liquid is exposed to the material descending from the furnace so that danger from rapid generation of excessive vapor pressures as the result of slipping or bridging in the furnace is avoided, and any generated vapor is readily released.

A further object of the invention is to provide an improved shaft furnace having a discharging means as defined in the preceding paragraph and wherein the rate of application of pressure pulses to the liquid seal is automatically controlled by the height of the material in the furnace.

Another object of the invention is to provide an improved shaft furnace discharging means as defined above and in which a column of liquid is provided externally of the liquid seal and communicating therewith with the said pressure pulses being applied periodically to the said column of liquid thereby causing the latter to act as a piston for effecting discharge of a part of the solid material which has gravitated from the furnace into the said liquid seal.

An additional object of the invention is to provide an improved shaft furnace and discharge means as defined above wherein the presence or absence of said material adjacent the bottom of the furnace and the temperature of the region automatically control the operation of the discharge means.

The invention further resides in certain novel features of the construction and arrangements of the parts of the apparatus in which the invention is embodied, and further objects and advantages of the invention will be apparent to those skilled in the art to which it pertains from the following description of the present preferred embodiment thereof which is described with reference to the accompanying drawings in which.

Figure 1:
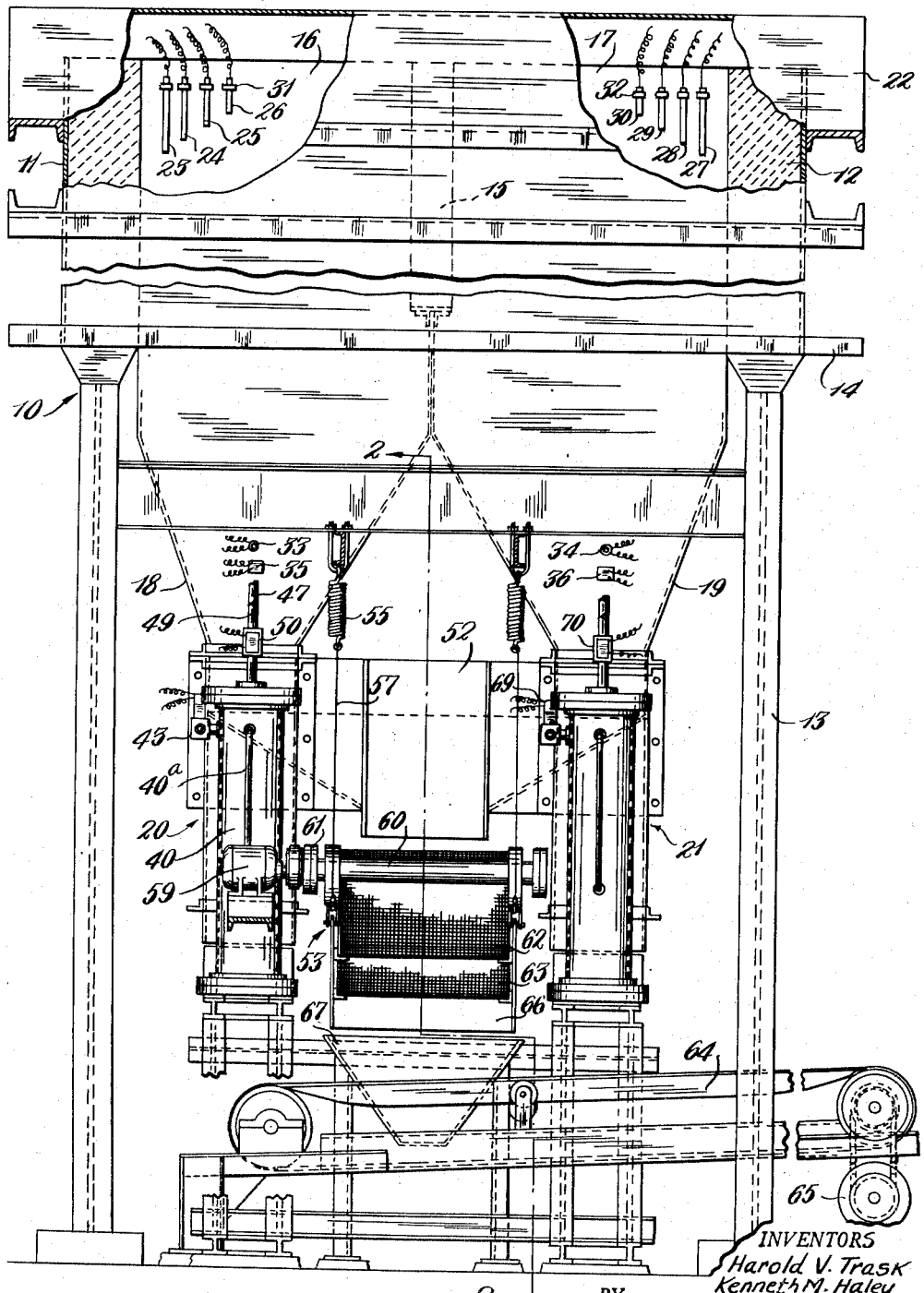
Fig. 1 is a front view of a shaft furnace embodying the invention, portions of the structure being broken away and others shown in section to more clearly illustrate the novel features.

Control of the discharge of solid materials from the bottoms of bins or other containers therefor may be effected by a wide variety of different apparatus when there is no problem of maintaining an air or gas seal at the point of discharge. However, where it is necessary to discharge solid material from the bottom of a structure in which it is contained, while at the same time maintaining a gas tight seal at this point, many conventional discharge controlling devices, such as conventional valves, conveyors, and the like, are not satisfactory. The problems incident to controlling discharge while preserving a gas seal are especially acute when the structure in which the material is contained is a furnace, such as a shaft furnace, from which a portion of the contents, in the form of discrete bodies of relatively hard, solid material, must be periodically discharged without release or leakage of the gas pressure in the furnace. Therefore, the present preferred embodiment of the invention is here illustrated and described as incorporated in such a shaft furnace for heating discrete bodies of mineral solids. It is to be understood, however, that the invention is not limited to this specific embodiment, but that it may be employed for controlling discharge of solid material from bins or other containers as well as from shaft furnaces.

The illustrated embodiment of the invention comprises a shaft furnace, generally designated 10, having a shell 11 and a lining of refractory material 12 supported by suitable columns 13 and horizontal members 14. In the form shown, the outside configuration of the furnace, in horizontal cross section, is substantially rectangular and it is divided transversely by a vertically extending partition wall 15 of refractory material, thus forming two independent compartments or shafts 16 and 17 respectively, each of which is substantially square in horizontal cross section. Each of the shafts or compartments 16, 17 merge at the bottom thereof into downwardly tapering hopper-like portions 18 and 19, respectively, which are individually connected with separate discharging mechanisms 20 and 21 operating, as hereinafter described, to periodically discharge a portion of the material from the bottom of each of the shafts.

The furnace 10 is intended to operate under gas pressure greater than atmospheric and hence is provided with a gas collecting and exhaust hood 22 extending along the front and back of the furnace adjacent the upper edges thereof and connected with a suitable exhaust means, not shown, for withdrawing the air and other gases issuing from the top of the furnace. Material to be heated in the furnace is charged thereto by a suitable conveying means moving over the top of the furnace to deposit the material substantially uniformly therein, the charging means preferably being combined with a movable cover so that the gas pressure may be maintained in the furnace. Suitable means, not shown, for supplying heated and/or unheated air or other gases to the furnace are also provided for effecting the desired heating of the material within the furnace. These structures for feeding the furnace and for supplying air or other gases thereto do not form a part of this invention and hence will not be described in detail since they may take any conventional form.

The furnace here illustrated and described is primarily intended for use in heating discrete bodies of mineral solids which may, for example, be substantially spherical pellets of iron ore concentrates and which are to be indurated, but preferably not fused, by heating. Consequently, the rate of movement of the bodies through the furnace must be carefully controlled so that they will be heated to the proper temperature. This, in turn, requires that the rate of discharge be correlated to the quantity of material within the furnace at any given time, and also preferably to the temperature of the material.

In order to determine the quantity of material in the furnace, each shaft or compartment 16 and 17 is provided adjacent the top thereof with spaced means adapted to provide a signal in response to the presence of material adjacent thereto. Since in the preferred embodiment, the bodies which are to be heated in the furnace are concentrates of iron ore, these bodies are electrically conductive and hence the material sensing means are here shown in the form of electrodes 23, 24, 25 and 26 in chamber 16 and 27, 28, 29 and 30 in chamber 17. The electrodes 23 and 27 are longer than the other electrodes and are adapted to be connected with the shell 11 or otherwise grounded to provide a common ground or return for the material sensing system. The electrodes 24 and 28 extend into the shafts 16 and 17 equal distances and represent the lowest level to which the discrete bodies or pellets should be allowed to fall during normal operation of the furnace. The electrodes 25 and 29 are similarly of equal length and are shorter than the electrodes 24 and 28, while the electrodes 26 and 30 are likewise of equal length and still shorter than the electrodes 25 and 29. The electrodes are each mounted by suitable supporting brackets, such as 31, 32, adjacent the lining 12 of the furnace wall. The sizes of the electrodes are exaggerated in the drawings for the sake of clarity, but it will be understood that the electrodes are relatively small and do not interfere with the normal movement of the material within the furnace. More than one set of electrodes may be provided in each of the shafts or compartments 16, 17, if necessary or desired, two such sets being shown diagrammatically in Fig. 4, which represents a schematic diagram of the electrical control circuit in which the electrodes are connected.

Figure 4:
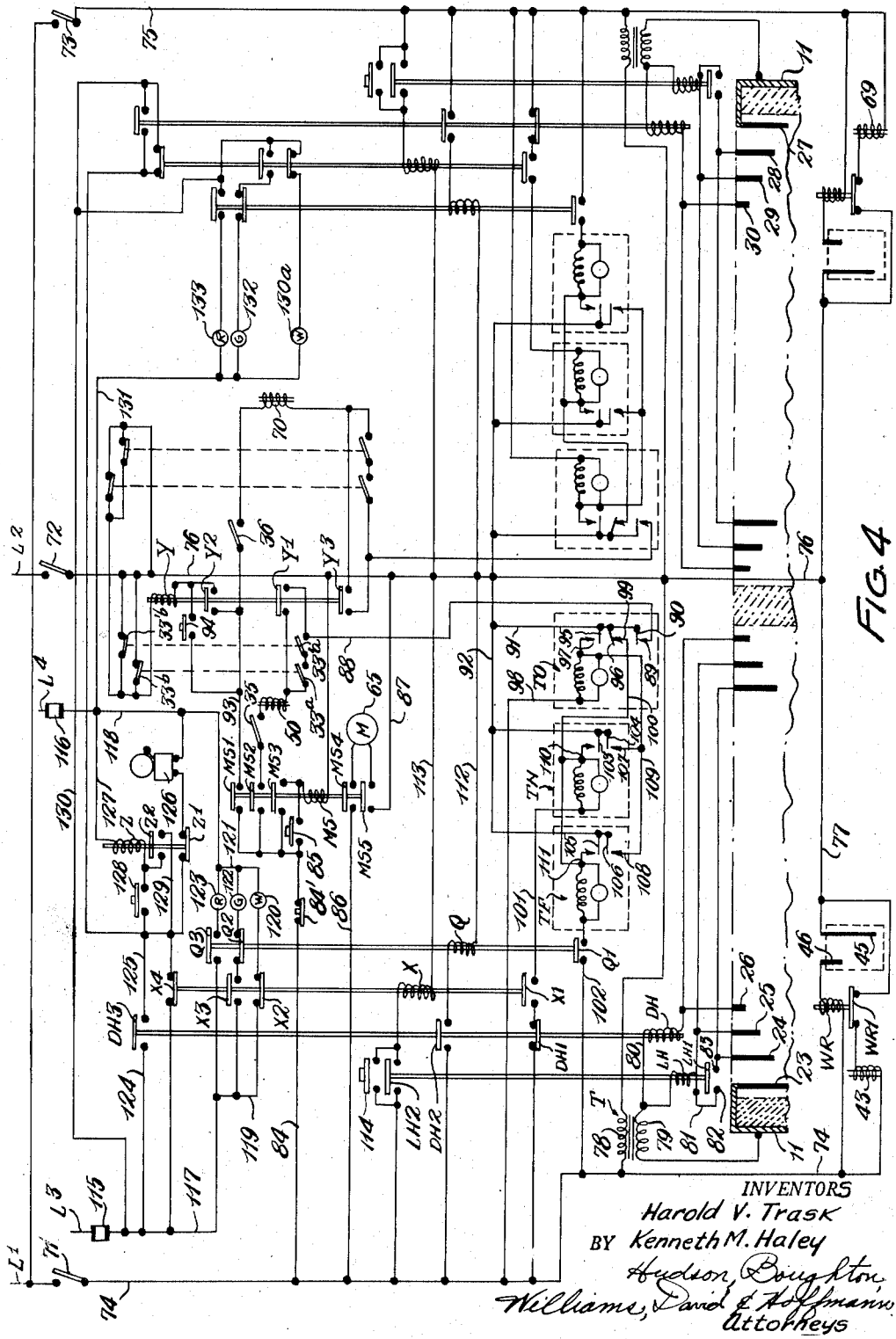
Fig. 4 is a simplified schematic wiring diagram of the control circuit governing operation of the discharging apparatus.

The lower tapered hopper-like portion 18, 19 of each shaft or compartment of the furnace is provided with temperature responsive means 33, 33' and 34, 34', respectively, which are preferably in the form of thermocouples for sensing the temperatures in these portions of the furnace. Also, within the tapered hopper-like portions 18, 19 of the furnace are material sensing means 35 and 36 which may be of any suitable construction but preferably comprise a member, movable in response to contact therewith of pellets or the material in the furnace, for operating an electrical contact or contacts. Such devices are conventional and may be of the type sold for use in storage bins and like installations. The connections of the electrodes 23–30, and of the electrical contacts operated by the thermocouples and the material responsive means 35 and 36 are illustrated in Fig. 4 and will be hereinafter described in detail.

As mentioned above, the shafts or chambers 16, 17 are identical and are equipped with identical devices so as to, in effect, be two independent furnaces. This is considered preferable to a single chamber or shaft of larger size in order that the heat may reach the bodies or pellets uniformly throughout. The invention is illustrated as embodied in such a multiple shaft furnace to demonstrate its adaptability thereto, it being understood that more than two shafts or chambers and associated discharge devices may be employed if desired. Obviously, therefore, the discharge control means 20 and 21 are identical and hence only one will be described in detail.

Figure 3:
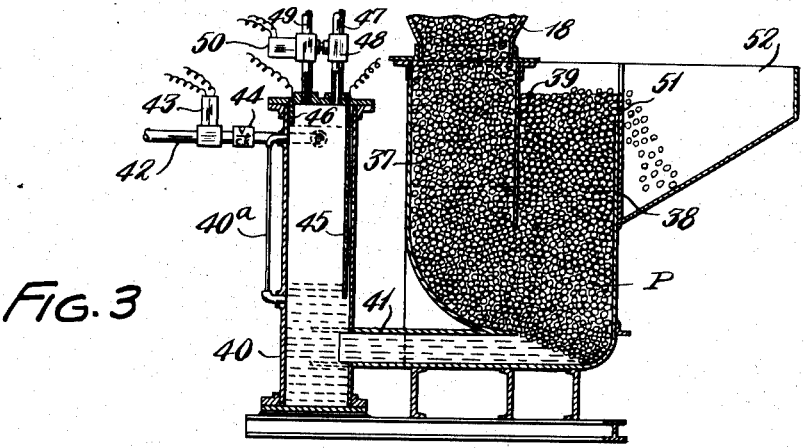
Fig. 3 is a longitudinal sectional view through the novel discharging apparatus per se illustrating the latter in operation discharging discrete bodies or pellets of solid material.
Figure 2:
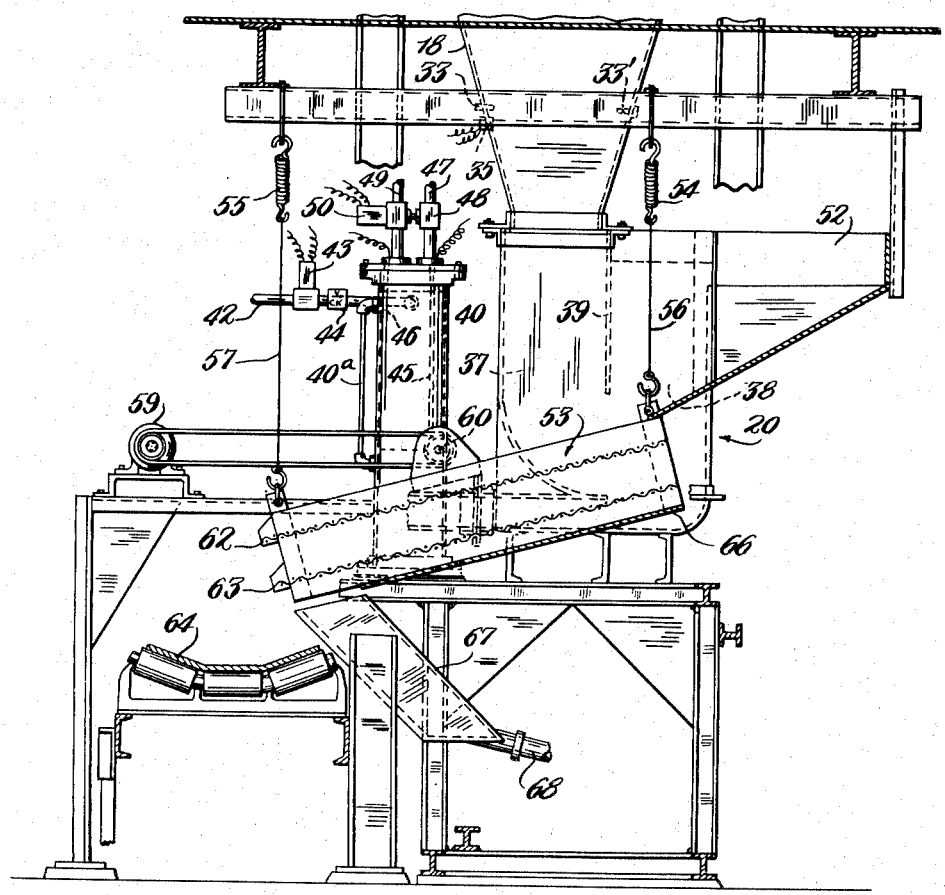
Fig. 2 is a fargmentary view taken substantially on the section indicating line 2—2 of Fig. 1 and illustrating the novel discharging apparatus in side elevation with certain of the associated parts shown in section.

Referring now to Figs. 2 and 3 of the drawings, it will be seen that the discharge control means 20 comprises two vertically extending chambers or compartments 37 and 38 which communicate with each other only adjacent the bottoms thereof, the compartments being separated throughout the majority of their heights by a vertically extending wall 39. The top of the compartment or chamber 37 is in direct alignment and communication with the bottom of the tapered hopper-like portion 18 of the furnace shaft 16 so that the pellets or other material within the latter gravitate downwardly into the chamber 37 and tend to move beneath the wall 39 and rise into the chamber 38, as will be apparent from Fig. 3 in which the material is shown in the form of substantially spherical pellets P. The top of the chamber 38 is open and provides the discharge opening. Communicating with the discharge control means 20 adjacent the bottom thereof is a means externally thereof for providing a vertically extending column of liquid. As illustrated, this means is in the form of a cylindrical vessel providing a chamber 40 communicating adjacent the lower portion thereof with the lower portion of the discharge means 20 through a conduit 41. The conduit 41 enters the discharge means 20 at a location which is preferably directly below the vertical wall 39 and in such a manner that the flow of liquid from it is substantially tangential to the course of flow of the pellets or other solids from chamber 37 and is directed toward the chamber 38. As will be clearly apparent from Figs. 2 and 3, the lower portion of the chamber 37 is preferably arcuate above the connection or conduit 41 with this arcuate wall terminating coextensive with the inner end of the conduit.

Water is supplied to the chamber 40 through a pipe 42 which is connected adjacent the top of the chamber, the flow of water through the conduit 42 being controlled by a solenoid operated valve 43 and a check valve 44, the check valve 44 being preferably interposed between the solenoid valve 43 and the chamber 40, so as to prevent reverse flow of water from the chamber and into the pipe 42. Extending into the chamber 40 from the top thereof are electrodes 45 and 46, electrode 45 having a length such as to at all times contact the water within the chamber 40 while the electrode 46 is in contact with the water in the chamber only when the latter has reached, or substantially reached, its maximum level therein. The electrodes 45 and 46 operate in a manner hereinafter described to control the operation of the solenoid valve 43, thereby controlling the application of water to the mechanism. The chamber 40 is also preferably provided with a sight glass 40a to indicate the water level in the chamber 40.

It will be apparent from the construction thus far described that when the valve 43 has opened, water from the pipe 42 can flow into the chamber 40 and will pass through the conduit or connection 41 into the compartments 37 and 38 of the discharge means 20 mixing with any fines therein to form a slurry or suspension thereof. The water will rise in the chamber 40 until it contacts the upper electrode 46 at which time a circuit will be completed, causing the valve 43 to close. The air within the compartment 40 is exhausted through a pipe 47 under control of a valve 48. The water and fines within the compartments 37 and 38 will seek a level commensurate with the level in the chamber 40 and the air or gas pressure in the furnace. That is to say, the water and fines will rise in the chamber 38 to a point substantially adjacent the open top thereof, while the level of the water and fines in compartment or chamber 37 will stand at a lower level due to the pressure of the gas in the furnace. In other words, the head of water in the chamber 40 is sufficient so that the lower edge of the wall 39 is completely submerged, with the result that the water and fines in chambers 37 and 38 comprise a liquid trap or seal for the furnace with the pellets or other solids from the furnace submerged therein.

The vessel which provides the chamber 40 is also provided, adjacent the top thereof, with a second pipe 49 to which fluid under pressure may be periodically applied under control of a solenoid operated valve 50. The operating member of the valve 50 is physically connected with the valve 48, so that when the valve 50 is open, the valve 48 is closed, and conversely. The pipe 49 is connected with a source of fluid under pressure, preferably air pressure, the pressure of which may be in the order of 75 lbs./sq. inch. The construction is such that, when the valve 50 is opened and the valve 48 closed, the fluid pressure rapidly applied to the chamber 40 through the pipe 49 acts upon the water in that chamber, displacing the latter in the form of a piston. This piston of water acts through the conduit 41 upon the liquid seal and the bodies or pellets P in the discharge means 20 to provide a rising current in the liquid of sufficient velocity to displace the said bodies or pellets P vertically upwardly so that they flow from the discharging means over the lip or edge 51 of the outer wall thereof, see Fig. 3. The height of this discharge lip or edge may be made adjustable by employing a separate plate adjustably connected to the outer wall of the chamber 38.

The fluid pressure exerted upon the water in the chamber 40 acts for a relatively short interval of time so that it is in the nature of a pressure pulse. The pressure is terminated by closing of the valve 50 and opening of the valve 48, whereupon water is again supplied to the chamber 40 from the pipe 42 replacing that which has been displaced so that the cycle may then be repeated. The quantity of water displaced in each cycle is never sufficient to break the seal or trap for the air or gases in the furnace, so that the air or gas pressure therein is never lost through discharge of the material.

The intervals between applications of pulses of fluid pressure to the chamber 40 are so proportioned as to allow enough time for the chamber 40 to fill with water, the minimum duration of this interval being determined by the pressure of the water source and the dimensions of the various parts of the apparatus. By way of example, but without limitation thereto, one satisfactory operation employed pressure pulses having a duration in the order of ½ second, the pulses being separated by intervals of from seven to fourteen seconds depending upon the desired rate of discharge of the material. The control of the application of pressure pulses to the system may be manually effected, but is preferably automatically controlled as hereinafter described.

The pellets P or other material discharged from the chamber 38 as the result of the pulses of pressure applied to the discharging mechanism 20 flow over the top or discharge lip 51 into an inclined chute 52 which directs the pellets to the upper end of a screening means 53. This screening means is preferably resiliently supported at an incline by springs 54, 55 and cables or rods 56, 57, and the screen is vibrated by a motor 59 driving a shaft 60 supported on the sides of the screen and provided with eccentrics 61, see Fig. 1. The screening means 53 preferably is provided with two spaced, perforate screening portions 62 and 63 although a greater or lesser number may be employed if desired. Bodies or pellets P having a size larger than the openings in the screen 62 and 63 move over the tops thereof onto a conveyor 64, which is preferably an endless belt troughed in the conventional manner and driven by an electric motor 65. The fines or screenings from the screening means 53 move along the inclined imperforate lower surface 66 to a funnel-like member 67 connected by a conduit 68 leading to a suitable point of disposal.

The material discharge means 21 is identically constructed and operates in like manner to that designated 20, being provided with a solenoid-operated valve 69 for the water supply and solenoid-operated valve 70 for controlling the application of the pulses of fluid pressure thereto. The pellets from the discharge means 21 likewise flow therefrom through a chute which is similar to the chute 52 and merges with the latter for directing the pellets or other bodies onto the screening means 53 as will be apparent from Fig. 1.

Referring now to Fig. 4, it will be seen that electrical power is supplied to the control circuit for the apparatus from power lines L1 and L2 through disconnect switches 71, 72 and 73, which may be individually operated but preferably are ganged for simultaneous operation. The switches 71 and 73, when closed, connect the power line L1 to the main supply-wires 74 and 75 of the circuit, while closing of switch 72 connects power line L2 to the main supply wire 76 of the circuit. The portion of the circuit to the left of wire 76 in the diagram represents the controls for the discharge means 20, while the portion of the circuit to the right of wire 76 represents the controls for the discharge means 21.

Since these two portions of the circuit are identical, only one will be described in detail.

The power wire 74 is connected to one terminal of the solenoid for the water valve 43, the other terminal of which is connected, in series, through the normally closed contact WR1 of a relay WR to a wire 77 connected with the power wire 76. The wire 77 is also connected with the electrode 45 in the chamber 40, while the electrode 46 in that chamber is connected to one terminal of the coil for relay WR, the other terminal of this relay coil being connected to the power wire 74. It will therefore be apparent that, when the water in the chamber 40 drops below the bottom of the top electrode 46, the circuit for the relay WR will be open so that the contact WR1 is closed, thus energizing the solenoid valve 43, opening the latter and allowing water to enter the chamber 40. When the water in the chamber 40 reaches the electrode 46, it closes the circuit between the electrodes 45 and 46, thus energizing relay WR causing the latter to open its contact WR1, thereby deenergizing the solenoid valve 43 so that the supply of water to the chamber 40 is terminated.

The power for the material sensing electrodes 23–26 is derived from a transformer T, the primary 78 of which is connected between the power wires 74 and 76. The secondary 79 of this transformer has one terminal thereof connected with the shell 11 of the furnace and hence with the electrode 23. The other terminal of the secondary 79 is connected by a wire 80 to one terminal of a relay DH, the other terminal of which is connected with the upper electrode 26. Also connected to the wire 80 is one terminal of a coil of a relay LH, the other terminal of which is connected with the middle electrode 25. In addition, a wire 81 connects the said other terminal of the coil of relay LH to a stationary contact 82 which is adapted to be bridged with a contact 83 by the movable contact LH1 of relay LH when the latter is energized. Since contact 83 is connected with the electrode 24, closing of contact LH1 connects electrode 24 to electrode 25 for a purpose which will hereinafter be apparent.

As mentioned above, the valves 48 and 50 are connected for simultaneous actuation by the solenoid for the latter valve. In the illustrated embodiment energization of this solenoid is under the control of timing devices which are adapted to periodically open the valve 50, and simultaneously close the valve 48, for a predetermined relatively short interval of time with the intervals between such operations being of considerably longer duration. These timing devices are preferably motor driven and are adjustable to provide contact operation after preselected time intervals. Since these devices are of conventional construction, the details thereof are not here set forth, the devices being schematically illustrated as motor driven and are designated TF, TN and TO in Fig. 4. The timing device TO is that which controls the interval during which the solenoid for valve 50 is operated to supply fluid under pressure to the water in the chamber 40, thus effecting discharge of a portion of the liquid in the mechanism 20 and of the solid material therein. The timer TN determines the length of interval between successive operations of the solenoid for valve 50 when the level of material in the furnace is in contact with the electrode 25. The timer TF provides for a more rapid operation of the discharge means by controlling the interval between operations of the valve 50 when the level of the material in the furnace engages the electrode 26.

In addition to the control exercised by the timers TO, TN and TF, the solenoid-operated valve 50 is also governed in its operation by the temperature in the lower portion or hopper 18 of the furnace as sensed by the thermocouples 33 and 33'. Thus, the absence of pellets in the said lower portion of the furnace, due to bridging or the like at a higher elevation, permits the air supplied to the bottom of the furnace to directly contact the thermocouples thereby cooling the latter so that they prevent operation of valve 50. The presence or absence of material in lower portion of the furnace; that is, in the tapered or hopper-like portion 18 acts through the device 35 to permit or prevent actuation of the valve 50 under control of the timing means. Furthermore, the valve 50 is controlled so that it cannot be operated unless the motor 65 for the conveyor 64 is in operation, thereby insuring that the material discharged from the furnace will be removed from the point of discharge.

The above-mentioned controls can be traced in the diagram comprising Fig. 4 by observing that the power wire 74 is connected with a wire 84 which is adapted to be connected with one terminal of a coil for a motor starter MS through a normally closed stop switch 84' upon operation of a manually actuated start button 85. The other terminal of the coil for the starter MS is connected with the power wire 76. Hence, when the button 85 is depressed, the motor starter MS is energized, closing its contacts MS1, MS2, MS3, MS4 and MS5. Closing of the contact MS3 provides a holding circuit for the starter MS about the push button 85 so that the latter may be released. Closing of the contacts MS4 and MS5 provides an energizing circuit for the motor 65 through the wires 86 and 87 connected with the power wires 74 and 76 respectively. Closing of the contact MS2 completes a circuit from the wire 84 to one terminal of a contact of the switch 35 which is closed by the pressure of material in the hopper portion 18 of the furnace and opens when this portion of the furnace does not have material therein. From the contact 35, this circuit continues to one terminal of the solenoid valve 50, the other terminal of which is adapted to be connected with a wire 88 upon closing of a contact Y1 of relay Y. The wire 88 is connected with a stationary contact 89 in the timing mechanism TO and the latter is adapted to be engaged by a movable contact 90 on operation of the timer TO, thus completing a circuit therethrough and through wires 91 and 92 to the power supply wire 76. Connected in parallel about the contact Y1 are contacts 33a and 33'a, which are normally open but which are closed by the thermocouples 33 and 33', respectively, when the temperature in the hopper portion 18 of the furnace attains a predetermined value by the presence of previously heated pellets therein.

The contact 33a is adapted to operate in conjunction with a normally closed contact 33b, while the contact 33'a is adapted to operate in conjunction with a normally closed contact 33'b. The contacts 33a, 33b and 33'a, 33'b are normally contained within conventional potentiometer type mechanisms which are connected with the thermocouples 33 and 33' for indicating the temperatures sensed thereby and for operating the said contacts in response to those temperatures. The normally closed contacts 33b and 33'b are connected in parallel between the power supply line 76 and one terminal of the coil for relay Y. The other terminal of this coil is adapted to be connected with a wire 93 by operation of a manual push button 94 and this wire 93 is connectible with the wire 84 through closing of the contact MS1 of the motor starter MS. The wire 93 is also connectible with the relay Y through closing of the contact Y2, thus providing a holding circuit about the switch 94. In addition to the contacts Y2 and Y1 the relay Y has a contact Y3 operating similar to the contact Y1 for controlling the operation of the solenoid valve 70 for the pressure pulses in the discharge control means 21.

In addition to the movable contact 90, the timer TO has movable contacts 95 and 96 connected with the wire 91, contact 95 being normally open but adapted to engage a stationary contact 97 connected with one terminal of the motor for the timer, the other terminal of which is connected by a wire 98 to the power wire 74. The movable contact 96 is normally engaged with a stationary contact 99 which is, in turn, connected by a wire 100 to one terminal each of the motors for the timers TN and TF. The other terminal of the motor for the timer TN is connected by a wire 101 in a circuit adapted to be closed by a normally open contact X1 of a relay X, the circuit continuing through the normally closed contact DH1 of the relay DH to the power wire 74. The other terminal of the motor for the timer TF is adapted to be connected by closing of the normally open contact Q1 of a relay Q to a wire 102 connected with the power wire 74. The wire 92 is also connected to the movable contacts 103 and 104 of the timer TN and to the movable contacts 105 and 106 of the timer TF. The movable contacts 104 and 106 are adapted, respectively, to engage stationary contacts 107 and 108, which are connected to each other and to the contact 97 of timer TO by a wire 109. The contacts 103 and 105 are adapted to respectively engage stationary contacts 110 and 111 which are connected to the wire 100 leading from the contact 99 to one terminal each of the motors for the timers TN and TF.

The aforementioned relay DH has a normally open contact DH2 which is adapted, when closed, to provide a circuit from the wire 74 to one terminal of the coil for relay Q, the other terminal of which is connected with the power wire 76 by a wire 112. The relay LH has a normally open contact LH2 which is adapted, when closed, to provide a circuit from the power wire 74 to one terminal of the coil for relay X, the other terminal of which is connected with the power supply wire 76 through a wire 113. Bridged about the contact LH2 is a manually operable switch 114, preferably of the push button type, which is provided to effect manual starting of the discharge apparatus, as will be hereinafter described.

In addition to the aforementioned power supply for the control circuit, a separate power supply is preferably provided for an alarm circuit, in order to insure that a failure of the conventional power supply will not interrupt the alarm circuit. This separate power supply for the alarm circuit is provided from power lines L3 and L4, which are connected through fuses 115 and 116 to the main wires 117 and 118 of the alarm circuit. Connected with the wire 117 is a wire 119 which provides a circuit through the normally closed contact X2 of relay X to a lamp 120 which is preferably white in color, the circuit continuing through wire 121 to the wire 118. Connected in parallel with the lamp W, between the wires 119 and 121, is a circuit for a lamp 122 which is preferably green in color, this circuit being controlled by the normally open contact X3 of relay X and the normally closed contact Q2 of relay Q. Also connected between the wires 119 and 121 is a lamp 123, preferably red in color, the circuit to which is controlled by the normally open contact Q3 of relay Q.

Connected with the wire 117 is a wire 124 which is adapted to be connected with a wire 125 upon closing of the normally open contact DH3 of relay DH. The wire 125 is connected through a normally closed contact Z1 of a relay Z to one side of a suitable alarm, here shown as a bell 126, the other side of this alarm being connected to the power wire 118 of the alarm circuit. One terminal of the coil for relay Z is connected by wire 127 to the power wire 118 of the alarm circuit, while the other terminal of this coil is adapted to be connected with the wire 125 through a switch 128 which may be of the push button type. Between the switch 128 and the coil of relay Z is a connection for a circuit adapted to be closed upon operation of the normally open contact Z2 of relay Z, this circuit continuing through a wire 129 and the normally closed contact X4 of relay X to the power wire 117 of the alarm circuit. In addition wires 125 and 129 are connected so that contact Z2 provides a holding circuit around switch 128. The wire 117 is also connected to a wire 130 and the wire 118 is connected to a wire 131 to provide power for the signal lamps 130a, 132 and 133 of the discharge means 21, these lamps being similar in nature and operation to the lamps 120, 122 and 123.

In addition to the aforementioned instrumentalities in the control and alarm circuits, the power lines L3 and L4 of the alarm circuit may be provided with suitable disconnect switches, if desired. Also the main control circuit and the alarm circuit may be provided with various protective devices and other conventional expedients which have not here been illustrated in order to simplify the disclosure.

In operating the apparatus, material to be indurated by heating in the furnace, for example, pellets of iron ore concentrates, are charged into the top thereof and heat is supplied to the interior of the furnace through conventional means not shown. The pellets or other material form a continuous column in the furnace extending from the bottom to the top with the previously indurated portion of the material disposed within the chambers 37 and 38 of the discharge means so that the water supplied to this portion of the apparatus provides a liquid seal for the bottom of the furnace. The pellets are maintained at a level in the furnace which is preferably intermediate the lower ends of the electrodes 24 and 26, so that the said pellets are in contact with the electrode 25. Consequently, when the disconnect switches 71, 72 and 73 are closed, a circuit is completed from the shell of the furnace through the secondary of the transformer 79 and the coil of relay LH to the electrode 25 and through the pellets to the electrode 23 which is in electrical engagement with the shell 11. The relay coil LH will therefore be energized causing it to close its contacts LH1 and LH2. Closing of the contact LH1 completes a circuit through the electrode 24 and the pellets to the electrode 23, thus maintaining the relay LH energized, even though the level of the pellets should subsequently fall below the lower end of electrode 25. Closing of the contact LH2 energizes the coil of the relay X causing the latter to operate its contacts X1 and X3 to closed positions and open its contacts X2 and X4. Opening of the contact X2 extinguishes the white signal light 120, while the closing of contact X3 illuminates the green signal light 122. Opening of the contact X4 breaks the circuit to the alarm bell 126 preventing operation of the latter.

The illumination of the green signal lamp 122 indicates that the level of the pellets in the furnace is proper for discharging operations to occur and if there are no obstructions to movements of pellets through the furnace, the pellets in the lower part of the furnace will have also operated the switch 35 to closed position. Also, the presence of heated pellets adjacent the discharge will have affected the thermocouples 33 and 33' so that the contacts 33a and 33'a are closed and contacts 33b and 33'b are opened. It will also be understood that the initial closing of the disconnect switches 71, 72 and 73 will have caused the chambers such as 40 to fill with water due to the completion of the circuits for the valves 43 and 69 through the contacts of their associated relays WR, the valves being held open until the water rises sufficiently within the chambers 40 to close the circuit between the electrodes such as 45 and 46, as previously described.

Although the apparatus is now prepared for discharging operations, such discharge cannot begin until the conveyor 64 has been placed in operation. Consequently, the operator now depresses the motor start button 85, thus completing a circuit through the latter energizing the motor starter MS, so that the latter closes its contacts MS1, MS2, MS3, MS4 and MS5. Closing of the contacts MS4 and MS5 energizes the motor 65, thus placing the conveyor 64 in operation for removing any discharged pellets. Closing of the contact MS3 completes a holding circuit therethrough for the motor starter MS so that the push button switch 85 may now be released and the starter MS will remain energized. Closing of the contact MS1 completes a circuit therethrough for control of the discharge means 21, while closing of the contact MS2 completes a circuit therethrough for control of the discharge means 20. Since these devices are identical and the control circuits are the same, only the last-mentioned circuit will be described.

The circuit closed through the contact MS2 by operation of the motor starter MS continues through the now closed switch 35, which is responsive to the pellets in the hopper or lower portion 18 of the furnace, and through the temperature controlled contacts 33a and 33'a which are now closed due to presence of properly heated pellets in the hopper portion of the furnace. From this point the circuit continues through the wire 88 to the stationary contact 89 of the timing mechanism TO. The previously mentioned closing of contact X1 completed a circuit from the wire 74 through the normally closed contact DH1 and the now closed contact X1 to the wire 101, which circuit continues through the motor for the timer TN and the wire 100 to the engaged contacts 96, 99 of the timer TO and from the latter through the wires 91 and 92 to the power wire 76. Consequently the timer TN, which provides the timing of the interval of normal duration between operations of the discharge means, is energized and begins its timing operation.

When the time interval for which the TN timer has been set has elapsed, it will operate its contacts 103 and 104 into engagement with the stationary contacts 110 and 107, respectively. The circuit completed through the contacts 103 and 110 maintains the timer TN in operation, while the engagement of the contacts 104 and 107 provides a circuit energizing the timer TO. This last mentioned circuit extends from the wire 74 through the wire 98 and the motor of the timer TO to the wire 109, thence through contacts 107 and 104 to the wire 92 which is connected with the power wire 76. Consequently the timer TO is now placed in operation and moves its contacts 90 and 95 to circuit closing engagement with the stationary contacts 89 and 97, respectively. Simultaneously the TO timer moves contact 96 from engagement with contact 99 but timer TN is not immediately stopped since its circuit is now completed through contact 103. This ensures that the timer TN will not stop with its contacts 103 and 104 in circuit closing positions but will operate until contact 103 moves from engagement with contact 110. Closing of contacts 95 and 97 of timer TO provides a circuit for continuing operation of this timer through its cycle, while closing of the contacts 89 and 90 completes the previously mentioned circuit for the solenoid or air valve 50, so that the latter is now energized, moving it to open position and simultaneously closing the valve 48.

Consequently, fluid under pressure, which in this instance is air pressure, is supplied to the top of the chamber 40 for an interval determined by the timer TO. This pressure pulse acts upon the water within the chamber 40 moving the latter, in the nature of a piston, into the discharge means 20 and rising therein displaces a part of the pellets and liquid therefrom and from the chamber 38 into the chute 52. The discharged pellets then travel over the vibrating screen means 53 to the conveyor 64 and are carried to a point of storage or utilization. Any fines which may have been carried downwardly within the furnace are likewise discharged, but are removed by the screens 62 and 63, along with the discharged water, through the chute 67 and the conduit 68. Consequently, the pellets which are received on the conveyor 64 have been cooled by the water and washed to remove fines from them.

The duration of the pressure pulse applied to the chamber 40 is relatively short and may, for example, be in the order of one-half second. This time interval is determined by the timer TO which is so set that, when the predetermined interval has elapsed, the timer will have moved to a position such that its contacts 90, 95 and 96 have been restored to their positions shown in Fig. 4 operation of the timer TO having continued after contacts 104 and 107 of timer TN separated due to the circuit through contacts 95 and 97 of the timer TO. When the contacts of timer TO are again restored to their initial positions the circuit through the solenoid valve 50 is opened at the contacts 89, 90 so that the valve 50 closes and the valve 48 opens. This permits the chamber 40 to again fill with water, since the chamber is now exhausted to atmosphere and the previous displacement of water from the chamber has exposed the electrode 46 therein so that the relay WR is deenergized. Consequently, a circuit is now completed through contact WR1 energizing the solenoid-operated valve 43 so that the latter again opens and water enters the chamber 40 until electrode 46 is again contacted as will now be understood. This filling of the chamber 40 is normally accomplished in much less time than the interval between successive pressure pulses, so that the chamber 40 is again filled with water in preparation for a new discharging operation well in advance of the application of the next pressure pulse.

When the TO timer contacts are restored to their initial positions after the discharging operation, the circuit to the motor for the TN timer is reestablished through the contacts 96, 99. Therefore, timing of a new interval begins under control of the TN timer. When this interval has elapsed, the contacts 103, 104 of the TN timer will again move to circuit closing positions, as previously described, thus again completing the circuit to the TO timer. As before the TO timer will operate the valve 50 for a predetermined short time interval thus applying a pressure pulse to the chamber 40 and hence causing another discharge of pellets from the furnace.

The aforementioned alternate operations of the TO and TN timers, effecting periodic discharge of material, normally continue without interruption so long as material is supplied to the furnace at substantially the same rate as that at which it is removed by the discharge means and so long as the temperature within the furnace remains proper and there is no bridging or hang-up of the material therein. However, in the event the material be supplied at a faster rate than that at which it is removed, the level of the material in the furnace will rise until the electrode 26 is contacted and this will then complete a circuit through the coil of the DH relay, energizing the latter. The resulting energization of the DH relay opens its contact DH1 and closes its contacts DH2 and DH3. Opening of the contact DH1 breaks the circuit to the TN timer, terminating operation of the latter. Closing of the contact DH2 completes a circuit energizing relay Q so that the latter closes its contacts Q1 and Q3 and opens its contact Q2. Opening of the contact Q2 breaks the circuit to the green signal lamp 122, while closing of the contact Q3 completes the circuit to the red signal lamp 123.

Closing of the contact DH3 completes a circuit through the latter and wire 125 to the normally closed contact Z1 and thence to the alarm bell 126, the circuit being completed from the latter to the alarm wire 118. Therefore the alarm 126 is sounded when the level of the pellets rises into engagement with the upper electrode 26 so that the operator is apprised of the fact that the rate of charging is excessive and may take steps to correct the same. If desired, the alarm bell 126 may be removed from the circuit by operating the push button switch 128 since this completes a circuit through the relay Z, energizing the latter, thus opening the contact Z1 in the circuit of the bell 126. The energization of the Z relay also has closed the contact Z2 so that the Z relay is maintained energized through a circuit extending from the wire 117 through the wire 124, contact DH3, wires 125 and 129 and the now closed contact Z2, relay Z and the wire 127, which is connected with power wire 118 of the alarm circuit.

Closing of the contact Q1 completes a circuit therethrough to the motor of the timer TF, this circuit being completed through the wire 110, and the contacts 96, 99 of the timer TO, and wires 91, 92 to the power wire 76. Consequently, the TF timer is now energized and, after the time interval for which it is adjusted, operates to move its contacts 105 and 106 to circuit closing relationship with contacts 111 and 108, respectively. Closing of the contact 106 to the contact 108 completes a circuit through the wire 109 to the motor of the timer TO, energizing the latter so that it operates to move its contacts 90 and 95 to circuit closing position and contact 96 to circuit opening position. Consequently, the energizing circuit for the TF timer through contacts 96 and 99 is broken. Nevertheless, the timer TF will continue to operate until its contacts return to open positions by virtue of the circuit therefor through its contacts 105 and 111. Closing of the contacts 89 and 90 energizes the solenoid valve 50, as previously described, thereby applying a pulse of fluid pressure to the chamber 40 thus effecting discharge of material. The closing of contacts 95 and 97 maintains the timer TO in operation until its contacts return to the positions illustrated whereupon the closing of contacts 89, 90 again energize the timer TF starting a new cycle of operations.

Therefore, the operation of the apparatus is now substantially the same as has been previously described for the timers TN and TO except that the interval between repeated pulses of fluid pressure is now determined by the timer TF instead of by the time TN. The timer TF is preferably so adjusted that its rate of operation is more rapid than that of the timer TN and may, for example, be twice as fast as the timer TN. Consequently, the periodicity of the pulses of fluid pressure is increased with the result that the rate of material discharge is increased so that the level of the material in the furnace will tend to drop if the charging rate is maintained constant.

When the material in the furnace has dropped below the lower end of electrode 26 but is in contact with the electrode 25, the circuit through the relay DH will be broken so that this relay is de-energized, thus causing the contact DH1 to close and the contacts DH2 and DH3 to open. Consequently, the TN timer will against be energized. Also, the Q relay will be de-energized, thus breaking the circuit to the timer TF and the red signal light 123 and establishing a circuit to the green signal lamp 122. Likewise, the circuit to the alarm bell 126 is opened, since the contact DH3 is now opened. In the event the alarm bell had been previously removed from the circuit by operation of the relay Z, the opening of the DH3 contact will also break the holding circuit for the Z relay de-energizing the latter, thus preparing the alarm bell for a new operation in the event the level of the pellets or other material in the furnace again rises to contact the electrode 26.

In the event the rate of discharge exceeds the rate of charge of material, the level of the material in the furnace will drop. If the level should fall below the lower end of the electrode 24, the circuit between the electrodes 23 and 24 will be broken thus de-energizing the relay LH so that the latter opens its contacts LH1 and LH2. Opening of the contact LH2 de-energizes relay X, causing the latter to open its contacts X1 and X3 and close its contacts X2 and X4. Closing of the contact X2 energizes the white signal lamp 120, while opening of the contact X3 extinguishes the green signal lamp 122. Opening of the contact X1 breaks the circuit to the timer TN and hence to the timer TO so that discharge of material from the furnace is terminated. The closing of the contact X4 completes a circuit through the latter and the normally closed contact Z1, energizing the alarm bell 126 so that the latter will direct the attention of the operator to the fact that the furnace level is below its proper height. The alarm may be removed from the circuit by momentarily actuating the switch 128, thus completing a circuit through this switch and the coil of the Z relay, energizing the latter so that the contact Z1 is opened and the contact Z2 is closed. Opening of the contact Z1 terminates energization of the alarm bell, while closing of the contact Z2 maintains the Z relay energized.

When the level of the material in the furnace has been raised to again contact the electrode 25, the LH relay will again be energized, closing its contacts LH1 and LH2. Closing of contact LH2 will again energize the X relay re-establishing the circuit to the timer TN so that the discharge may again resume. Likewise, the signal lamp 120 will be extinguished and the lamp 122 will be illuminated and the circuit to the alarm cutoff relay Z will be broken so that the alarm bell 126 is again conditioned for operation in the event the level of the material should again drop below the bottom of the electrode 24.

During normal operation of the apparatus the discharge will continue automatically, as just described, and will require no attention from the operator. However, it sometimes happens that material will "bridge" or "hang up" with the result that the top level of the material will not drop appreciably, although the material beneath the bridge continues to be removed at the usual rate. As a matter of fact, if the bridge be sufficiently large, the level of the material in the furnace may actually increase due to the continuous charge of material thereto. This will cause an even more rapid discharge of material from the furnace, since the electrode 26 will be contacted, thus bringing into action the rapid timer TF. This is highly undesirable and might result in damage to the furnace or injury to the personnel, in the event the hot material from a point higher up in the furnace should suddenly drop into the water of the water seal. The material responsive switch 35 has been provided to prevent such an occurrence, since it will open if there be no material adjacent this switch as would be the case in the event a bridge of the material formed within the shaft of the furnace. Upon the formation of such a bridge and the resulting depletion of the material thereunder in the hopper-like portion 18, the opening of switch 35 will break the circuit to the solenoid-operated valve 50. Hence, even though the timers, such as TN, TF and TO, continue in operation, pressure pulses cannot be applied to the chamber 40 and hence discharge of material will be terminated until such time as material again accumulates in the hopper portion 18 of the furnace and closes the switch 35.

The thermocouples 33 and 33' provide an additional precaution against such an occurrence, since the absence of pellets adjacent thereto will allow the thermocouples to cool and cause them to operate to open the contacts 33a and 33'a and close the contacts 33b and 33'b. This opening of contacts 33a and 33'a terminates operation of the discharge means since the circuit therethrough for the solenoid operated valve 50 is broken. Consequently, automatic discharge of the material is terminated.

Should material be in the lower portion of the furnace but at lower than a predetermined temperature so that automatic discharge of the material in the furnace is prevented by the above-mentioned opening of contacts 33a and 33'a and closing of contacts 33b and 33'b, the discharging action may be manually initiated by operation of the push button switch 94. Thus, with the conveyor 64 in operation, the contact MS1 is closed and hence a circuit will be completed, upon operation of switch 94, from the wire 74 through wire 84, switch 84', contact MS1, wire 93, switch 94, and the coil of the relay Y to and through the now closed contacts 33b and 33'b. Therefore, relay Y is energized, causing the latter to close its contacts Y1, Y2, and Y3. Contact Y2 provides a holding circuit for the Y relay so that the switch 94 may be released without de-energization of the relay. Closing of the contact Y1 provides a bridging circuit about the now open contacts 33a and 33'a so that discharge of the material within the furnace is now effected under control of the timers TN, TF and TO even though the material is unheated or is at a lower temperature than that desired in the normal operation of the furnace. This discharging operation will, however, continue under control of the material responsive electrodes 24, 25 and 26, as previously described.

When the material within the furnace has reached the predetermined temperature for operation of the contacts 33a and 33'a to closed positions, the circuit through the latter to the timer TN will again be closed. Hence, normal automatic operation of the discharge may be resumed in the event the level of the material within the furnace is sufficient to contact the level indicating electrodes as has been previously described. This restoration of the contacts 33a and 33'a to closed positions will have simultaneously opened the contacts 33b and 33'b, thereby de-energizing relay Y so that the previously described circuit which permitted discharge without control by the thermocouples is broken.

In the event it is desired to operate the discharge means when the level of the material is below the electrodes in the top of the furnace, this may be effected by actuating the manual switch 114. This energizes the X relay which completes the necessary circuits for operation of the TN and TO timers as will now be apparent. This mode of operation therefore enables the furnace to be substantially emptied of material and may be effected regardless of the temperatures of the material since push button 94 may also be actuated to by-pass contacts 33a and 33'a in the event the material is below the predetermined temperature for operation of these contacts.

While one portion of the control and alarm circuits for operating one only of the discharge means has been described in detail, it will be apparent that the other discharge means 21 operates for control of the discharge from the other shaft of the furnace in the same manner. It will also be evident that, although the illustrated embodiment discloses a furnace having two parallel shafts with two discharge means, a furnace having only one shaft and discharge means may be employed if desired or more than two shafts and discharge means may be utilized when greater capacity is desired. It will also be apparent that, in the normal operation of the apparatus, a liquid seal is at all times maintained for the bottom of the furnace so that air or gas pressure therein is not lost during discharge of the material. Moreover, there are no moving parts contacting the pellets or other material being discharged so that wear is reduced to a minimum. Furthermore, the discharging apparatus is not affected by the size of the material and hence can discharge both the fines which may develop in the operation of the furnace as well as the larger particles which are the unbroken discrete bodies or pellets P. Similarly, clusters of pellets which may occur can pass through the discharge means so long as they do not exceed the dimension between the lower end of the partition wall 39 and the bottom of the compartments 37, 38, thus enabling the discharge means to handle clinkers or fused material of larger size than that which can be normally passed through conventional grates or discharge plates. It will also be evident that, where the furnace is operating upon pellets or similar discrete bodies of mineral solids, the product issuing from the furnace is free of fines and dust and has been cooled to a point where it will not injure conventional conveyor belts, thus facilitating handling.

An important feature of the invention is the elimination of danger of explosions resulting from sudden generation of excessive gas or vapor pressure by highly heated material contacting the liquid of the seal in the discharge means. This hazard is eliminated not only by the provision of the aforementioned thermocouples and material responsive switches in the hopper-like portions 18 and 19, which prevent automatic discharge when "bridging" or "hanging" occurs in the furnace, but also by the novel design and proportions of the discharge means 20 and 21. Thus it will be noted that the cross sectional area of the compartment 37 of the discharge means is very materially less than that of the furnace shaft and the depth of the liquid in the discharge means necessary to provide the gas seal is small compared to the height of the furnace. Consequently, only a small quantity of liquid is exposed to descending material at a given interval of time with the result that, even in the case of a "slip" or the like which might cause red hot solids to drop into the liquid, the quantity of such solids in contact with the liquid would be such that the amount of vapor generation would not cause a a serious explosion. Moreover, any sudden or excessive gas or vapor generation is easily and safely relieved through the chamber or compartment 38 comprising the discharge leg of the apparatus.

Although the invention has been illustrated and described with particular reference to its incorporation in a shaft furnace for heating discrete bodies of mineral solids, it will be evident that the invention may be employed for discharging other materials from other receptacles or containers, as, for example, from bins or containers which are not shaft furnaces but in which it is desired to maintain an air or gas pressure without leakage or loss during discharge of the material therefrom. Also, although the liquid used for effecting the discharge and the seal is water, other liquids may be employed. Likewise, a means other than pulses of air pressure may be employed to provide the periodic piston like displacement of the water or other liquid from the chamber 40 with sufficient velocity to effect lifting of the solids over the discharge lip. In view of these and other possible adaptations and modifications, the invention is not to be considered as limited to the specific details of construction here illustrated and described except as may be required by the spirit and scope of the appended claims.

Having thus described the invention, we claim:

1. In a shaft furnace for indurating discrete bodies of mineral solids, means providing a liquid seal at the bottom of said furnace into which the indurated bodies move, the said means having a discharge opening spaced above the bottom thereof, means for periodically applying pressure to the liquid in said seal at a rate sufficient to displace a portion of the liquid and the indurated bodies therein through the said discharge opening, and means to replace the portion of the liquid displaced through the discharge opening.

2. The combination as defined in claim 1 and further comprising means responsive to the temperature in the region intermediate the furnace proper and the said liquid seal providing means, and means actuated by said temperature responsive means for preventing the said periodic application of pressure to the liquid in said seal until the temperature of said region has attained a predetermined value.

3. The combination as defined in claim 2 and further comprising manually operable means for initiating the said periodic application of pressure to the liquid in said seal before the temperature of said region has attained the said predetermined value.

4. The combination as defined in claim 1 and further comprising means adjacent the lower portion of said furnace for sensing the presence of the said bodies therein, and means responsive to said sensing means and operatively connected to said means for periodically applying pressure to said liquid seal for preventing operation thereof when no bodies are sensed.

5. The combination as defined in claim 1 and wherein the means for applying pressure to the liquid comprises means for applying air under pressure to said liquid, and means to periodically operate said applying means for an interval of short duration thereby providing a pressure pulse.

6. In a shaft furnace for indurating discrete bodies of mineral solids, means providing a liquid seal at the bottom of said furnace into which the indurated bodies gravitate, the said means having a discharge opening spaced above the bottom thereof, means for periodically applying pressure to the liquid in said seal at a rate sufficient to displace a portion of the liquid and the indurated bodies therein through the said discharge opening, means for replacing the portion of said liquid displaced through the discharge opening, and means responsive to the level of solids in said furnace for controlling the cyclic pediodicity of the said application of pressure thereby controlling the rate of discharge from said furnace.

7. In a shaft furnace for indurating discrete bodies of mineral solids, means providing a liquid seal at the bottom of said furnace into which the indurated bodies gravitate, the said means having a discharge opening spaced above the bottom thereof, means providing a column of liquid external of said furnace and in communication with said seal, and means for periodically applying pressure to the surface of the liquid in said column at a rate sufficient to cause the latter to act as a piston for displacing a portion of the liquid of said seal and the indurated bodies therein through the said discharge opening.

8. The combination as defined in claim 7 and wherein the means for applying pressure comprises means for applying fluid under pressure to the surface of said column of liquid and time controlled means for operating said applying means with cyclic periodicity.

9. In a shaft furnace for indurating discrete bodies of mineral solids, means providing a liquid seal at the bottom of said furnace into which the indurated bodies gravitate, the said means having a discharge opening spaced above the bottom thereof through which the bodies can move only when force is applied thereto, means for applying fluid pressure to said liquid seal for displacing a portion of the liquid of said seal and the indurated bodies therein through said discharge opening, timing means operatively connected with said pressure applying means to control the duration of operation of the latter, and a second timing means operatively connected to control the intervals between operations of the first-mentioned timing means.

10. The combination as defined in claim 9 and further comprising means responsive to the height of the material in said furnace, a third timing means operative to provide intervals between operations of the first-mentioned timing means of different duration from those provided by the second mentioned timing means, and means operatively connecting the material height responsive means to the second and third mentioned timing means for selective operation thereof in accordance with the height of the material in the furnace.

11. In a shaft furnace, means providing a liquid seal at the bottom of said furnace in which the material passing through said furnace is received, the said means comprising two chambers communicating adjacent their bottoms with the top of one of said chambers substantially aligned with the interior of said furnace and with the other of said chambers provided with a discharge opening adjacent its top, means for supplying liquid to said chambers to a height above the level of the communication therebetween, and means for periodically applying a pressure pulse to the liquid in said seal at a rate sufficient to displace a portion of said liquid and the material from said furnace through the said discharge opening.

12. In a shaft furnace, means providing a liquid seal at the bottom of said furnace in which the material passing through said furnace is received, the said means comprising two chambers communicating adjacent their bottoms with the top of one of said chambers substantially aligned with the interior of said furnace and with the other of said chambers provided with a discharge opening adjacent its top, means providing a column of liquid externally of said chambers and communicating with the latter adjacent the bottoms thereof with the height of said column sufficient to cause the liquid in said chambers to stand at a height above the level of the communication therebetween, and means for periodically applying a pressure pulse to the surface of the liquid in said column at a rate sufficient to cause the latter to act as a piston for displacing a portion of said liquid and the material from said furnace through the said discharge opening.

13. The combination as defined in claim 12 and further comprising means for supplying liquid to said column providing means, and means responsive to the level of liquid in said column for controlling said supplying means.

14. The combination as defined in claim 12 and further comprising means responsive to the top of the material in said furnace for controlling the cyclic periodicity of the said application of pressure pulses to the liquid in said column.

15. In a shaft furnace, means providing a liquid seal at the bottom of said furnace in which the material passing through said furnace is received, the said means comprising two chambers communicating adjacent their bottoms with the top of one of said chambers substantially aligned with the interior of said furnace and with the other of said chambers provided with a discharge opening adjacent its top, a closed vessel connected adjacent its bottom with said one chamber adjacent the bottom of the latter, a liquid supply pipe connected to said vessel for supplying liquid to the latter and to said chambers, the height of said vessel being such that the level of the liquid in said chambers is above the communication therebetween thereby providing a liquid seal for the bottom of said furnace, and means for rapidly applying fluid under pressure to the liquid in said vessel thereby creating a rising current of said liquid of sufficient velocity to lift a portion of the material from said furnace through the said discharge opening.

16. The combination as defined in claim 15 and wherein the means for applying fluid under pressure to said vessel includes a fluid supply pipe connected to said vessel, a valve in said pipe, and timing means connected to said valve for periodically operating the latter.

17. The combination as defined in claim 16 and further comprising means responsive to the height of the material in said furnace, a second timing means for operation of said valve at a different time interval than that effected by the first-mentioned timing means, and operative connections from said material height responsive means to said timing means for selective operation of the latter such that the first-mentioned timing means is effective to operate said valve when the material in the furnace is at a predetermined height and the second-mentioned timing means is effective for operation of said valve when the material in said furnace extends above said predetermined height.

18. The combination as defined in claim 15 and further comprising temperature responsive means adjacent the lower portion of said furnace for sensing the temperature at that region, and means actuated by said temperature responsive means for preventing actuation of said valve if the temperature sensed is below a predetermined value.

19. The combination as defined in claim 15 and further comprising power operated conveyor means positioned to receive the material displaced through said discharge opening and convey the same to a location remote from said furnace, and means responsive to operation of said conveyor means for controlling the operation of said valve.

20. An apparatus of the type described for effecting discharge of solid material from a container therefor comprising two chambers communicating adjacent their bottoms with one of said chambers in communication with the bottom of the container for the material to be discharged and with the other of said chambers provided with a discharge opening adjacent its top, means providing a column of liquid externally of said chambers and communicating with the latter adjacent the bottoms thereof with the height of said column sufficient to cause the liquid to enter said chambers and to stand therein at a height above the communication therebetween, and means for applying a pressure pulse to the surface of the liquid in said column thereby causing liquid to act as a piston for displacing a portion of said material through said discharge opening.

21. An apparatus as defined in claim 20 wherein the connection of said column to said chambers is located adjacent the bottom of said one chamber on the side opposite the said communication between the chambers and substantially directed towards the other chamber whereby the liquid displaced from said column is directed for moving the material in said one chamber into said other chamber.

22. An apparatus as defined in claim 20 and further comprising means responsive to the presence of material in said container and operatively connected with the said means for applying a pressure pulse to selectively permit or prevent operation of the latter.

23. An apparatus as defined in claim 20 and further comprising timing means for repeatedly applying pressure pulses to the surface of the liquid in said column with periodic regularity, and means responsive to the height of material in said container and operatively connected to the said timing means for controlling the rate of application of said pressure pulses.

24. An apparatus of the type described for effecting discharge of solid material from a container therefor comprising two chambers communicating adjacent their bottoms with one of said chambers in communication with the bottom of the container for the material to be discharged and with the other of said chambers provided with a discharge opening adjacent its top, means providing a column of liquid externally of said chambers and communicating with the latter adjacent the bottom thereof with the height of said column sufficient to cause the liquid to enter said chambers and to stand therein at a height above the communication therebetween, means for periodically applying pressure to the surface of the liquid in said column thereby causing the latter to act as a piston for displacing a portion of the material through the discharge opening, power operated conveyor means positioned to receive said material and convey the same to a location remote from said apparatus and means responsive to operation of said conveyor means for controlling the operation of said means for periodically applying pressure to the liquid in said column.

25. An apparatus of the type described for effecting discharge of solid material from a container therefor, the said apparatus comprising two chambers communicating adjacent their bottoms with one of said chambers in communication with the bottom of the container for the material to be discharged and with the other of said chambers provided with a discharge opening adjacent its top, means providing a column of liquid externally of said chambers and communicating with the latter adjacent the bottoms thereof with the height of said column sufficient to cause the liquid to enter said chambers and to stand therein at a height above the communication therebetween, means for applying fluid pressure to the surface of the liquid in said column at a rate sufficient to cause that liquid to act as a piston for displacing a portion of the material through said discharge opening, timing means operatively connected with said pressure applying means to control the duration of operation of the latter, and a second timing means operatively connected to control the intervals between operations of the first-mentioned timing means.

26. The combination as defined in claim 25 and further comprising means responsive to the height of the material in said furnace, a third timing means operative to provide intervals between operations of the first-mentioned timing means of different duration from those provided by the second mentioned timing means, and means operatively connecting the material height responsive means to the second and third mentioned timing means for selective operation thereof in accordance with the height of the material in the furnace.

27. In a shaft furnace, means providing a liquid seal at the bottom of said furnace including two chambers communicating adjacent their bottoms with the top of one of the chambers substantially aligned with the interior of said furnace and with the other of said chambers provided with a discharge opening adjacent its top, means for supplying liquid to said chambers to a height above the level of the communication therebetween, the dimensions of said chambers relative to that of the furnace being such that only a small quantity of liquid in said seal is exposed to material descending from said furnace in a given interval of time thereby preventing sudden generation of excessive pressures, and means for periodically applying a pulse of fluid pressure to the liquid in said seal at a rate sufficient to displace a portion of said liquid and the material from said furnace through the said discharge opening, whereby movement of the material through said furnace is effected by said periodically applied pressure pulses and any pressures generated by hot material contacting said liquid are relieved through said seal.

HAROLD V. TRASK.
KENNETH M. HALEY.

References Cited in the file of this patent

UNITED STATES PATENTS

| Number | Name | Date |
|---|---|---|
| 2,268,535 | Schutte | Dec. 30, 1941 |
| 2,273,126 | McGillin | Feb. 17, 1942 |
| 2,310,377 | Voorhrees | Feb. 9, 1943 |
| 2,511,017 | Sherban | June 13, 1950 |
| 2,539,638 | Schilling | Jan. 30, 1951 |
| 2,542,239 | Engels et al. | Feb. 20, 1951 |

FOREIGN PATENTS

| Number | Country | Date |
|---|---|---|
| 628,336 | Great Britain | Aug. 26, 1949 |